United States Patent
Hsu

(10) Patent No.: US 9,755,536 B2
(45) Date of Patent: Sep. 5, 2017

(54) CONTACTLESS INDUCTIVELY COUPLED POWER TRANSFER SYSTEM

(71) Applicant: PowerWow Technology Inc., Zhubei (Hsinchu) (TW)

(72) Inventor: Jr-Uei Hsu, Taipei (TW)

(73) Assignee: PowerWow Technology Inc., Zhubei (Hsinchu) (TW)

( * ) Notice: Subject to any disclaimer, the term of this patent is extended or adjusted under 35 U.S.C. 154(b) by 809 days.

(21) Appl. No.: 14/029,372

(22) Filed: Sep. 17, 2013

(65) Prior Publication Data

US 2014/0092649 A1   Apr. 3, 2014

(30) Foreign Application Priority Data

Sep. 28, 2012 (TW) .............................. 101135916 A

(51) Int. Cl.
*H02M 5/42* (2006.01)
*H01F 38/14* (2006.01)
*H02J 5/00* (2016.01)

(52) U.S. Cl.
CPC .............. *H02M 5/42* (2013.01); *H01F 38/14* (2013.01); *H02J 5/005* (2013.01)

(58) Field of Classification Search
CPC . H01F 38/14; H02M 5/42; H02M 2003/1552; H02M 2003/1555; H02M 2003/1557; H02M 2007/4818; H02M 7/5157; H02J 5/005; H02J 3/16; H02J 3/18; H02J 3/1842; H02J 3/1864; H02J 3/1871
See application file for complete search history.

(56) References Cited

U.S. PATENT DOCUMENTS

| | | | | |
|---|---|---|---|---|
| 5,831,841 A | * | 11/1998 | Nishino | H02J 5/005 191/10 |
| 6,844,702 B2 | * | 1/2005 | Giannopoulos | H02J 7/025 320/108 |
| 2007/0109708 A1 | * | 5/2007 | Hussman | H02J 1/00 361/113 |
| 2009/0160355 A1 | * | 6/2009 | Suzuki | H05B 41/2824 315/291 |
| 2010/0225271 A1 | * | 9/2010 | Oyobe | B60L 5/005 320/108 |

(Continued)

OTHER PUBLICATIONS

Boys, et al., Inductive Power Transfer Control, Feb. 16, 2012, WO 2012/021072.*

*Primary Examiner* — Fred E Finch, III
*Assistant Examiner* — Demetries A Gibson
(74) *Attorney, Agent, or Firm* — Abelman, Frayne & Schwab

(57) ABSTRACT

A contactless inductively coupled power transfer system includes a power supply device and a power receiving device. The power supply device includes a primary winding for generating an electromagnetic field (EMF) in response to an AC current flow having an operating frequency. The power receiving device includes a resonant circuit outputting an output voltage to a load and including a secondary winding and a reactance element. The reactance element is capable of forming a parallel resonant LC circuit with the secondary winding that resonates at the operating frequency, and forming a series resonant LC circuit that resonates at the operating frequency, and that is to be connected in series to the load.

15 Claims, 7 Drawing Sheets

(56) References Cited

U.S. PATENT DOCUMENTS

| | | | | |
|---|---|---|---|---|
| 2010/0295373 A1* | 11/2010 | Eisenring | .................. | H02J 7/00 |
| | | | | 307/66 |
| 2011/0196544 A1* | 8/2011 | Baarman | ................. | H02J 5/005 |
| | | | | 700/291 |
| 2011/0221569 A1* | 9/2011 | Hamel | ................. | A61B 5/0031 |
| | | | | 340/9.1 |
| 2012/0223587 A1* | 9/2012 | Nishiyama | ............... | H03H 7/40 |
| | | | | 307/104 |
| 2013/0121036 A1* | 5/2013 | Peng | ...................... | H02M 1/32 |
| | | | | 363/21.02 |
| 2014/0028108 A1* | 1/2014 | Hsu | ........................ | H02J 5/005 |
| | | | | 307/104 |
| 2015/0035377 A1* | 2/2015 | James | .................... | H02J 5/005 |
| | | | | 307/104 |

\* cited by examiner

CONTACTLESS INDUCTIVELY COUPLED POWER TRANSFER SYSTEM

CROSS-REFERENCE TO RELATED APPLICATION

This application claims priority of Taiwanese Patent Application No. 101135916, filed on Sep. 28, 2012.

BACKGROUND OF THE INVENTION

1. Field of the Invention

The invention relates to a contactless inductively coupled power transfer (ICPT) system.

2. Description of the Related Art

A wireless power transfer system has been used to replace some conventional contact conductive power transfer systems because the wireless power transfer system is capable of transferring power in a contactless manner and thus may be used in situations where wire connections are unsuitable.

In U.S. Patent Application Publication No. 20070109708, a conventional wireless power transfer system is disclosed. The wireless power transfer system includes a supplying device and a receiving device, each of which includes a winding used for transferring electric power. In general, the receiving device of the wireless power transfer system may include a conventional LC resonant circuit. Inductance and capacitance of the conventional LC resonant circuit are adjustable, such that a level of an output voltage of the receiving device and a resonant frequency of the conventional LC resonant circuit thereof may be controlled.

When the conventional LC resonant circuit implemented using a series connection of an inductor and a capacitor is resonating, resultant impedance of the series connection of the inductor and the capacitor is substantially zero. Hence, the conventional LC resonant circuit may be regarded as an ideal voltage source but with a voltage gain equal to or smaller than one. When the conventional LC resonant circuit implemented using a parallel connection of an inductor and a capacitor is resonating, the voltage gain thereof may be greater than one, but resultant impedance of the parallel connection of the inductor and the capacitor is substantially infinite. Such conventional LC resonant circuit may be regarded as an ideal current source.

The practical demand is an ideal voltage source with a characteristic of variable voltage gain. The reason for this is that when the supplying device and the receiving device are relatively distant from each other, coupling therebetween is relatively weak, and thus an induced voltage of the receiving device may drop to a level that is insufficient for power supply and may not meet requirements of some loads.

Furthermore, when observed from the supplying device, the receiving device often has input impedance. The input impedance when observed from the supplying device may vary according to different factors, such as coupling, load condition of the receiving device, tuning condition of the receiving device, etc. Variation of the input impedance may change a current flowing through the winding of the supplying device. Since the winding of the supplying device is adapted to generate an electromagnetic field in response to the current flowing through the winding, the change of the current may result in instability of power supply at the receiving device.

SUMMARY OF THE INVENTION

Therefore, an aspect of the present invention is to provide a contactless inductively coupled power transfer (ICPT) system capable of stable power supply.

Accordingly, a contactless ICPT system of the present invention comprises a power supply device and a power receiving device. The power supply device includes a primary winding which is for generating an electromagnetic field in response to an alternating current (AC) current flow having a variable (i.e., controllable) operating frequency. The power receiving device includes a resonant circuit which is adapted to output an output voltage to a load according to induction of the electromagnetic field, and which includes a secondary winding and a reactance element. The secondary winding generates an open-circuit voltage according to induction of the electromagnetic field. The output voltage is associated with the open-circuit voltage. The reactance element is coupled electrically to the secondary winding and is capable of forming a parallel resonant LC circuit with the secondary winding. The parallel resonant LC circuit resonates at the operating frequency. The reactance element is configured to form a series resonant LC circuit that resonates at the operating frequency, and that is to be connected in series to the load.

Another aspect of the present invention is to provide another contactless ICPT system capable of stable power supply.

Accordingly, a contactless ICPT system of the present invention comprises a power supply device and a power receiving device. The power supply device includes a rectifier circuit (e.g., an AC-to-DC converter), a frequency converter circuit (e.g., a DC-to-AC inverter), a primary winding, an adjustment circuit and a control circuit. The rectifier circuit is adapted for receiving an AC signal (i.e., AC power) and converting the AC signal into a direct current (DC) signal (i.e., DC power). The frequency converter circuit is coupled electrically to the rectifier circuit for receiving the DC signal and converting the DC signal into an AC current flow that has an operating frequency. The primary winding is for generating an electromagnetic field in response to the AC current flow. The adjustment circuit is coupled electrically between the frequency converter circuit and the primary winding, and includes an adjustable reactance member which is connected in series with the primary winding and which is controllable to adjust equivalent reactance of the adjustable reactance member. The control circuit is coupled electrically to the adjustable reactance member for adjusting the equivalent reactance thereof. The power receiving device includes a secondary winding that generates an open-circuit voltage according to induction of the electromagnetic field and that is adapted for supplying electric power associated with the open-circuit voltage to a load. The power receiving device has input impedance when observed from the primary winding. The equivalent reactance of the adjustable reactance member is adjusted so as to cancel out reactance of the input impedance.

An effect of the present invention resides in that the resonant circuit resonates at the operating frequency such that an output of the resonant circuit may be regarded as an ideal voltage source and has a variable voltage gain. Moreover, the adjustable reactance member may cancel out the reactance of the input impedance, such that a current flowing through the primary winding of the power supply device may not be influenced by the power receiving device.

It is noted that the power supply device is also maintained in resonant condition, in which a resonant frequency of the adjustment circuit and the primary winding is controlled to match the operating frequency. Furthermore, the resonant circuit of the power receiving device may be controlled to adjust a voltage gain of the resonant circuit while maintaining its ideal voltage source characteristics through adjustment of passive components thereof in order to meet load requirements.

BRIEF DESCRIPTION OF THE DRAWINGS

Other features and advantages of the present invention will become apparent in the following detailed description of a preferred embodiment with reference to the accompanying drawings, of which.

DETAILED DESCRIPTION OF THE PREFERRED EMBODIMENT

Figure 1:
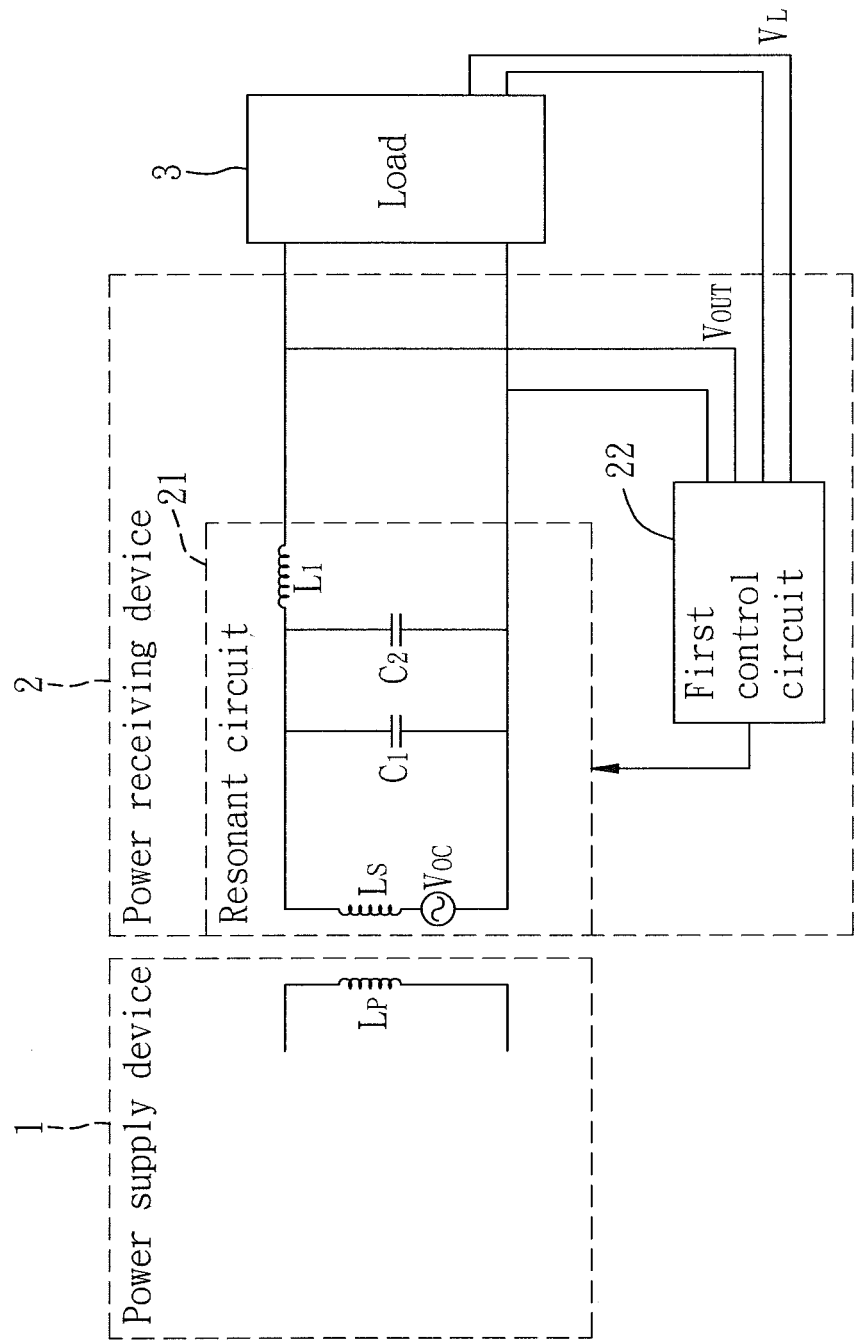
FIG. 1 is a fragmentary circuit diagram of a preferred embodiment of a contactless inductively coupled power transfer (ICPT) system, according to the present invention, illustrating architecture of a power receiving device.

Referring to FIG. 1, a preferred embodiment of a contactless inductively coupled power transfer (ICPT) system according to the present invention is suitable for supplying electricity to a load 3, and comprises a power supply device 1 and a power receiving device 2.

The power supply device 1 includes a primary winding $L_P$ which is for generating an electromagnetic field in response to an alternating current (AC) current flow having a variable operating frequency. The operating frequency is variable and is decided according to different needs at the load 3. However, in other embodiments, the operating frequency may be fixed.

The power receiving device 2 includes a resonant circuit 21 and a first control circuit 22.

The resonant circuit 21 is adapted to output an output voltage $V_{OUT}$ to the load 3 according to induction of the electromagnetic field, and includes a secondary winding and a reactance element. The secondary winding generates an open-circuit voltage $V_{OC}$ according to induction of the electromagnetic field, and has winding inductance $L_S$. The output voltage $V_{OUT}$ is associated with the open-circuit voltage $V_{OC}$. The reactance element is coupled electrically to the secondary winding and is capable of forming a parallel resonant LC circuit with the secondary winding. The parallel resonant LC circuit resonates at the operating frequency and has the winding inductance $L_S$ and capacitance $C_1$. The reactance element is configured to form a series resonant LC circuit that resonates at the operating frequency, that is to be connected in series to the load 3, and that has capacitance $C_2$ and inductance $L_1$. Since the parallel resonant LC circuit and the series resonant LC circuit both resonate at the operating frequency, there exists a relationship of $L_S \times C_1 = L_1 \times C_2$.

Figure 2A:
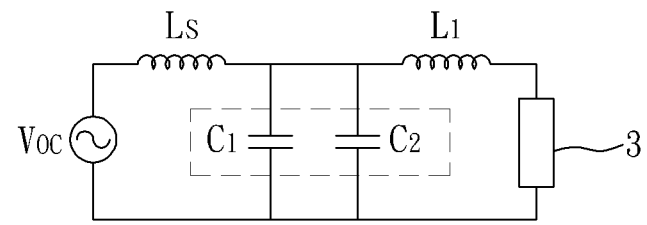
FIGS. 2A to 2D are schematic diagrams illustrating equivalent circuits of a resonant circuit of the preferred embodiment.
Figure 2B:
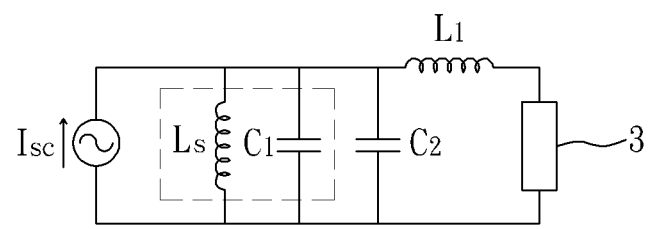

Referring to FIG. 2A, the open-circuit voltage $V_{OC}$ and the winding inductance $L_S$ may be converted into a Norton equivalent circuit to form a short-circuit current source $I_{SC}$ connected in parallel with the winding inductance $L_S$ as shown in FIG. 2B. The short-circuit current Source $I_{SC}$ may be represented as $$I_{SC} = \frac{V_{OC}}{j\omega L_S}$$

wherein $\omega$ is the angular frequency associated with the operating frequency.

Under the aforementioned resonating condition, resultant impedance of a parallel connection consisting of the winding inductance $L_S$ and the capacitance $C_1$ of the parallel resonant LC circuit is substantially infinite and thus the parallel connection may be regarded as open-circuited.

Figure 2C:
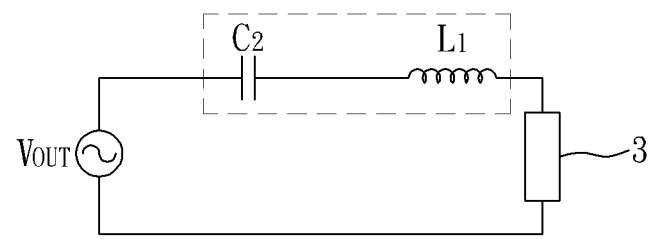
Figure 2D:
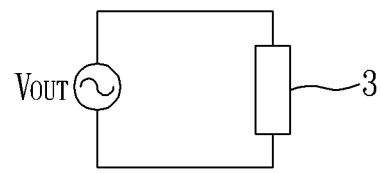

Subsequently, the short-circuit current source $I_{SC}$ and the capacitance $C_2$ of the series resonant LC circuit shown in FIG. 2B may be converted into a Thevenin equivalent circuit to form the output voltage $V_{OUT}$ connected in series to the capacitance $C_2$ of the series resonant LC circuit as shown in FIG. 2C. Under the aforementioned resonating condition, resultant impedance of a series connection consisting of the capacitance $C_2$ and inductance $L_1$ of the series resonant LC circuit is substantially zero and thus the series connection may be regarded as short-circuited. Finally, the resonant circuit 21 may form an ideal voltage source as shown in FIG. 2D, and a value of the output voltage $V_{OUT}$ may be represented as $$V_{OUT} = \frac{I_{SC}}{\omega C_2} = \frac{V_{OC}}{\omega^2 L_S C_2} = \frac{L_1}{L_S} V_{OC} = \frac{C_1}{C_2} V_{OC} = k \cdot V_{OC}.$$

The output voltage $V_{OUT}$ has a gain of k with respect to the open-circuit voltage $V_{OC}$, and the value of k is one of a ratio of the inductance $L_1$ of the series resonant LC circuit to the winding inductance $L_S$, and a ratio of the capacitance $C_1$ of the parallel resonant LC circuit to the capacitance $C_2$ of the series resonant LC circuit. Therefore, by adjusting the capacitance $C_1$ of the parallel resonant LC circuit, and the capacitance $C_2$ and inductance $L_1$ of the series resonant LC circuit to conform to the relationship of $L_S \times C_1 = L_1 \times C_2$, the resonant circuit 21 may form an ideal voltage source, and the aforesaid capacitance and inductance may be further adjusted according to the desired gain of k.

In this way, elements with fixed capacitance and inductance may be adopted to implement, according to the aforementioned ratios, the capacitance $C_1$ of the parallel resonant LC circuit, and the capacitance $C_2$ and inductance $L_1$ of the series resonant LC circuit. However, when a specific voltage gain is desired or when the capacitance and inductance change along with usage environment or aging, a dynamic adjustment is required for increasing or decreasing the ratios.

Referring to FIG. 1, when the dynamic adjustment is required, the reactance element is an adjustable element, and is coupled electrically to the first control circuit 22. The first control circuit 22 is coupled electrically to the resonant circuit 21 for detecting the output voltage $V_{OUT}$, and is to be coupled electrically to the load 3 for detecting a load voltage $V_L$ across the load 3, so as to generate a plurality of adjusting signals associated with the output voltage $V_{OUT}$ and the load voltage $V_L$ for controlling the reactance element.

It is noted that, when the load 3 is an AC load, the output voltage $V_{OUT}$ may be outputted directly from the resonant circuit 21 to the load 3. On the other hand, when the load 3 is a direct current (DC) load, the power receiving device 2 may further include a rectification circuit (not shown) to be coupled electrically between the resonant circuit 21 and the load 3, and the rectification circuit is used to output a DC voltage to the load 3 by rectifying and filtering the output voltage $V_{OUT}$. Therefore, the output voltage $V_{OUT}$ and the load voltage $V_L$ may be different inputs for the first control circuit 22.

In FIG. 2, for the convenience of theoretical explanation, the capacitances $C_1$ and $C_2$ of the parallel resonant LC circuit and the series resonant LC circuit are calculated separately, but in practice, one or more parallel capacitors may be adopted to realize the capacitances $C_1$ and $C_2$. Three design types to realize the capacitances $C_1$ and $C_2$ are introduced hereinafter.

Figure 3:
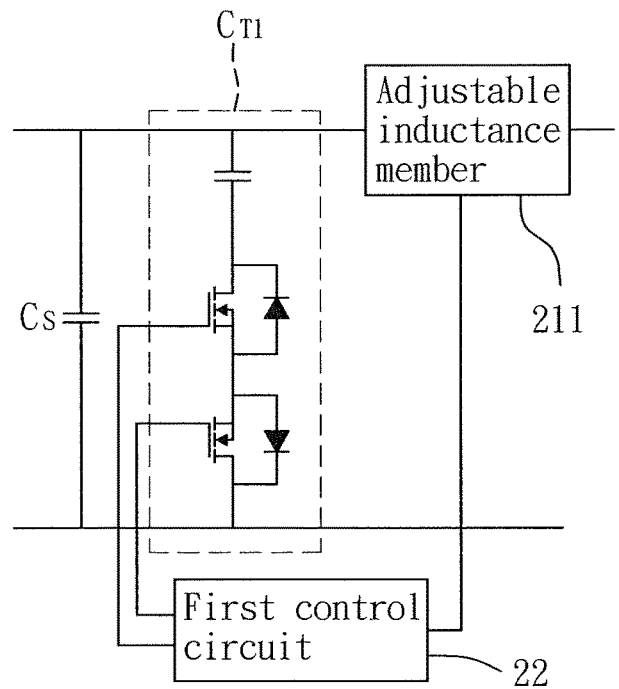
FIG. 3 is a circuit diagram illustrating a fixed capacitor and a first adjustable capacitor of the preferred embodiment.

FIG. 3 illustrates a first design type, in which the resonant circuit 21 includes a fixed capacitor $C_S$, a first adjustable capacitor $C_{T1}$, and an adjustable inductance member 211. The fixed capacitor $C_S$ is coupled electrically to two ends of the secondary winding and is used to provide the capacitance $C_1$ of the parallel resonant LC circuit. The first adjustable capacitor $C_{T1}$ has first and second ends coupled electrically and respectively to two ends of the fixed capacitor $C_S$, and is coupled electrically to the first control circuit so as to be controlled thereby for adjusting equivalent capacitance of the first adjustable capacitor $C_{T1}$ that serves as capacitance $C_2$ of the series resonant LC circuit. The adjustable inductance member 211 has a first end coupled electrically to the first end of the adjustable capacitor $C_{T1}$ and a second end to be coupled electrically to one end of the load 3, and is coupled electrically to the first control circuit 22 so as to be controlled thereby for adjusting equivalent inductance of the adjustable inductance member 211 that serves as the inductance $L_1$ of the series resonant LC circuit.

The first adjustable capacitor $C_{T1}$ includes a series connection of a capacitor and two transistors. The two transistors are coupled electrically to the first control circuit 22 to be controlled thereby to switch between conduction and nonconduction, so as to vary the equivalent capacitance of the first adjustable capacitor $C_{T1}$. The design of the adjustable capacitor $C_{T1}$ is well known to the skilled in the art, and the design is not limited to those disclosure in the present invention.

Figure 4:
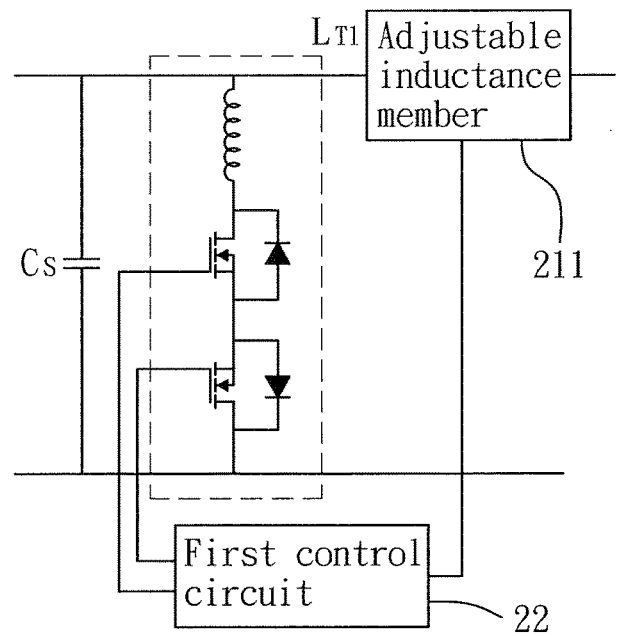
FIG. 4 is a circuit diagram illustrating a fixed capacitor and a first adjustable inductor of the preferred embodiment.

FIG. 4 illustrates a second design type, in which the resonant circuit 21 includes a fixed capacitor $C_S$, a first adjustable inductor $L_{T1}$, and an adjustable inductance member 211. The fixed capacitor $C_S$ is coupled electrically to two ends of the secondary winding and is used to provide the capacitance $C_1$ of the parallel resonant LC circuit and a component capacitance. The first adjustable inductor $L_{T1}$ has first and second ends coupled electrically and respectively to two ends of the fixed capacitor $C_S$, and is coupled electrically to the first control circuit 22 so as to be controlled thereby for adjusting equivalent inductance of the first adjustable inductor $L_{T1}$. The component capacitance in combination with the equivalent inductance of the first adjustable inductor $L_{T1}$ serve as the capacitance $C_2$ of the series resonant LC circuit. The adjustable inductance member 211 has a first end coupled electrically to the first end of the first adjustable inductor $L_{T1}$ and a second end to be coupled electrically to one end of the load 3, and is coupled electrically to the first control circuit 22 so as to be controlled thereby for adjusting equivalent inductance of the adjustable inductance member 211 that serves as the inductance $L_1$ of the series resonant LC circuit.

In a third design type, the reactance element of the resonant circuit 21 includes an adjustable capacitor (not shown) and an adjustable inductance member (not shown). The adjustable capacitor is used to substitute for the aforesaid fixed capacitor $C_S$ and first adjustable capacitor $C_{T1}$ in the first design type, or the aforesaid fixed capacitor $C_S$ and first adjustable inductor $L_{T1}$ in the second design type. The adjustable capacitor is coupled electrically to two ends of the secondary winding, and is coupled electrically to the first control circuit 22 so as to be controlled thereby for adjusting equivalent capacitance of the adjustable capacitor that serves as the capacitances $C_1$ and $C_2$ of the parallel resonant LC circuit and the series resonant LC circuit. The adjustable inductance member has a first end coupled electrically to one end of the adjustable capacitor, and a second end to be coupled electrically to one end of the load 3, and is coupled electrically to the first control circuit 22 so as to be controlled thereby for adjusting equivalent inductance of the adjustable inductance member that serves as the inductance $L_1$ of the series resonant LC circuit.

There are also many ways to realize the inductance $L_1$ of the series resonant LC circuit by the adjustable inductance member 211, and two of the ways are introduced hereinafter.

Figure 5:
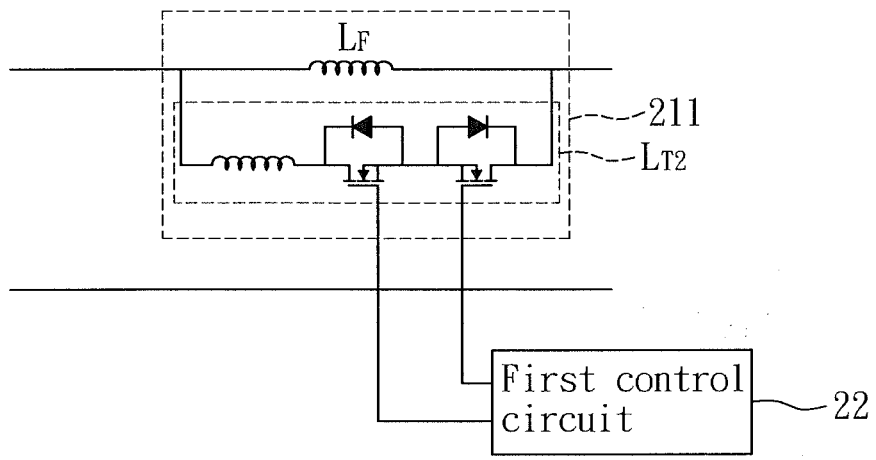
FIG. 5 is a circuit diagram illustrating a fixed inductor and a second adjustable inductor of the preferred embodiment.

FIG. 5 illustrates a first way, in which the adjustable inductance member 211 includes a fixed inductor $L_F$ and a second adjustable inductor $L_{T2}$. The second adjustable inductor $L_{T2}$ is connected in parallel with the fixed inductor $L_F$, and is coupled electrically to the first control circuit 22 so as to be controlled thereby for adjusting equivalent inductance of the second adjustable inductor $L_{T2}$.

Figure 6:
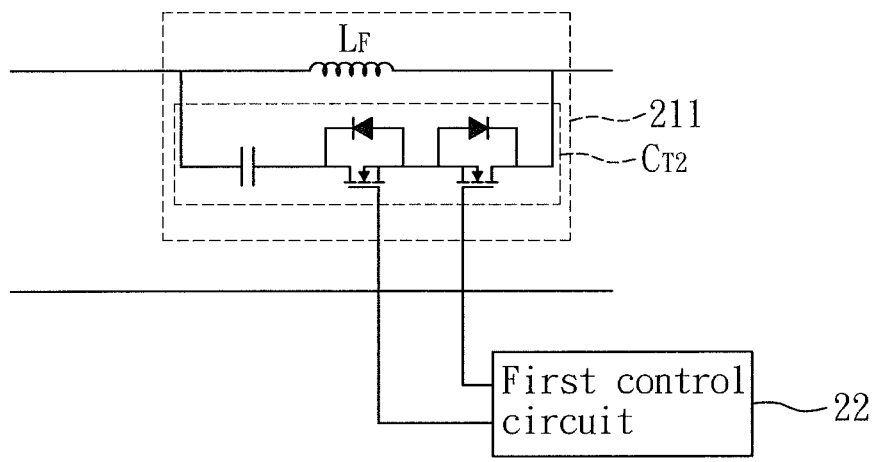
FIG. 6 is a circuit diagram illustrating a fixed inductor and a second adjustable capacitor of the preferred embodiment.

FIG. 6 illustrates a second way in which the adjustable inductance member 211 includes a fixed inductor $L_F$ and a second adjustable capacitor $C_{T2}$. The second adjustable capacitor $C_{T2}$ is connected in parallel with the fixed inductor $L_F$, and is coupled electrically to the first control circuit 22 so as to be controlled thereby for adjusting equivalent capacitance of the second adjustable capacitor $C_{T2}$.

It is noted that the adjustable inductance member 211 may simply be an adjustable inductor.

Figure 7:
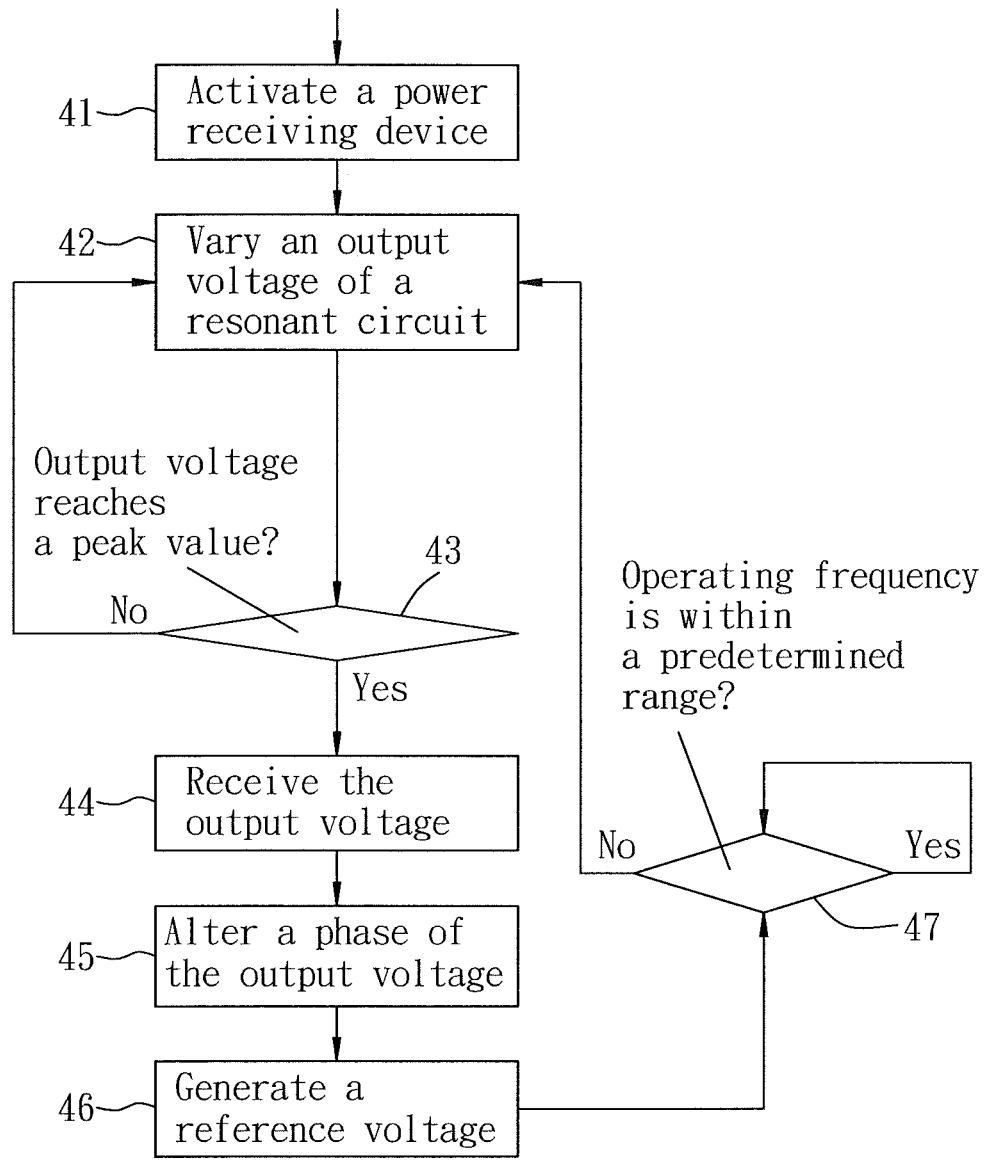
FIG. 7 is a flowchart for illustrating generation of a reference voltage in the preferred embodiment.

A phase difference between the open-circuit voltage $V_{OC}$ and the output voltage $V_{OUT}$ has a functional relationship with a resonant frequency of the resonant circuit 21. Therefore, the phase difference therebetween may be used to determine whether the resonant frequency corresponds to the operating frequency of the contactless ICPT system, so as to further control impedance (or reactance) of the resonant circuit 21. The output voltage $V_{OUT}$ may be detected by the first control circuit 22 through electrical coupling to the resonant circuit 21. However, since there are technical difficulties to directly detect the open-circuit voltage $V_{OC}$ of the secondary winding, a detecting winding may be utilized for indirect detection according to induction of the electromagnetic field. Nevertheless, in some miniaturized apparatuses, there is no space for accommodating the detecting winding, or otherwise the detecting winding is too close to a space occupied by the secondary winding such that the accuracy of detection may be influenced as a result of mutual coupling therebetween. Another approach is to estimate instead of to detect. In such an approach, the first control circuit 22 includes a reference voltage generator 222 (see FIG. 8) for estimating the frequency and phase of the open-circuit voltage $V_{OC}$. Referring to FIG. 7, the process of estimation includes the following steps.

In step 41, when the power receiving device 2 is activated, the capacitance $C_2$ and inductance $L_1$ of the series resonant LC circuit were set in preliminary system design to enable an initial state of the output voltage $V_{OUT}$ to turn on the first control circuit 22 such that the reference voltage generator 222 is activated.

In step 42, the reference voltage generator 222 is configured to adjust one of the capacitance $C_2$ and inductance $L_1$ of the series resonant LC circuit so as to vary the output voltage $V_{OUT}$ of the resonant circuit 21. At this moment, the resonant frequency of the resonant circuit 21 is changing.

In step 43, the reference voltage generator 222 is configured to determine whether the output voltage $V_{OUT}$ reaches a peak value. The output voltage $V_{OUT}$ is at the peak value when the resonant frequency of the resonant circuit 21 corresponds to the operating frequency. The flow goes back to step 42 when it is determined that the output voltage $V_{OUT}$ does not reach the peak value. It is noted that the peak value may be predetermined. Alternatively, the peak value may be a local peak, i.e., a largest value among others within a given neighborhood.

In step 44, the reference voltage generator 222 is configured to receive the output voltage $V_{OUT}$ when the output voltage $V_{OUT}$ reaches the peak value.

In step 45, the reference voltage generator 222 is configured to alter a phase of the output voltage $V_{OUT}$ by 180 degrees (for example, by means of a NOT gate).

In step 46, the reference voltage generator 222 is configured to generate a reference voltage according to a result of step 45.

In step 47, the reference voltage generator 222 is configured to determine whether the operating frequency is within a predetermined range (for example, a 10% tolerance of the operating frequency). In the affirmative, step 47 is repeated. Otherwise, the flow goes back to step 42. It is noted that the operating frequency may be dynamically varied depending on the actual requirements. However, it is also a common practice to have the operating frequency fixed at a certain value. The provided method is practical for both situations if a target operating frequency at which the contactless ICPT system is desired to operate is externally controlled in step 47, and the predetermined range, for example, may be a 10% tolerance of the target operating frequency.

In the preferred embodiment, it may be known by theorem that when the resonant circuit 21 is resonating, the phase difference between the open-circuit voltage $V_{OC}$ and the output voltage $V_{OUT}$ is 180 degrees. Therefore, phase and frequency of the reference voltage estimated by the steps mentioned above substantially match those of the open-circuit voltage $V_{OC}$. The reference voltage is stored in the first control circuit 22 for representing the open-circuit voltage $V_{OC}$.

Figure 8:
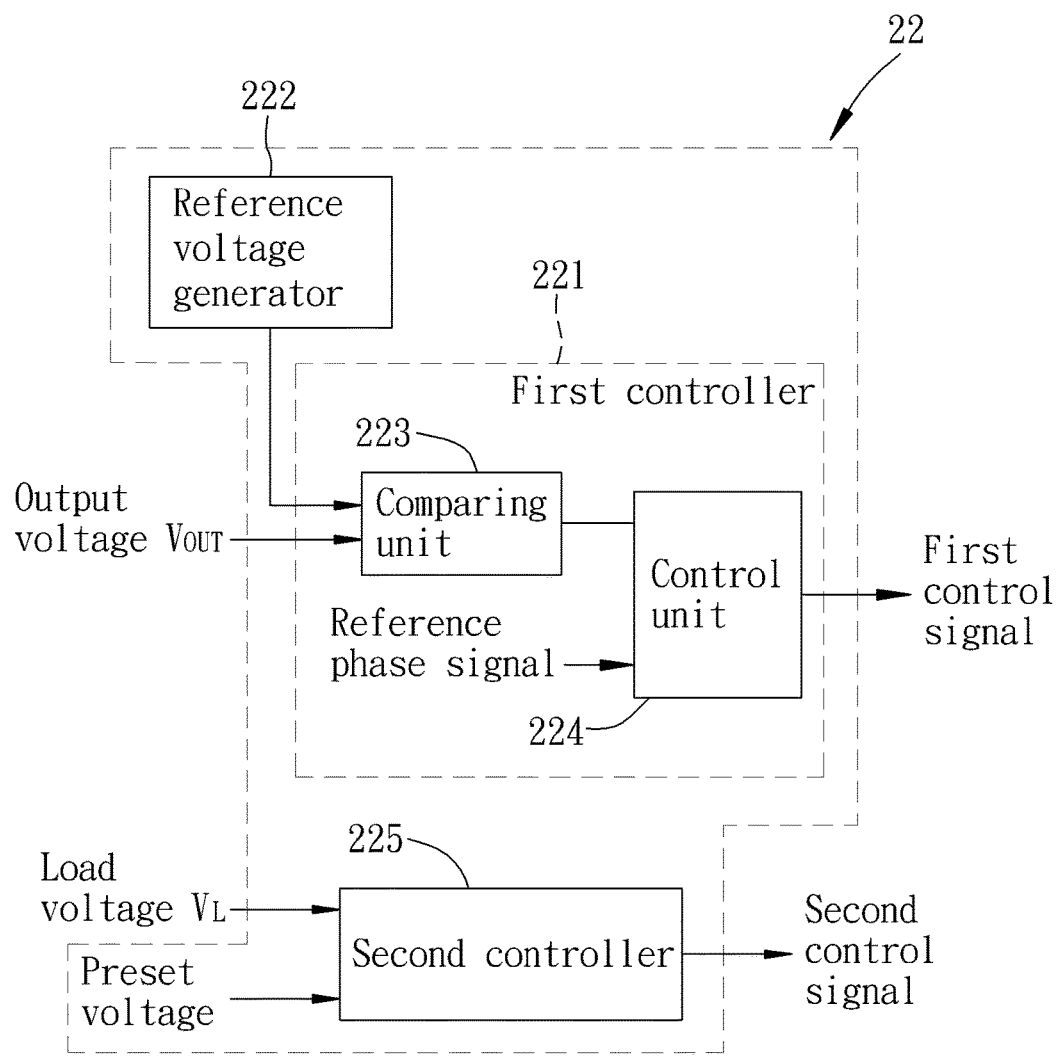
FIG. 8 is a block diagram illustrating a first controller and a second controller of the preferred embodiment.

Referring to FIG. 8, the first control circuit 22 includes a first controller 221 and a second controller 225. The first controller 221 detects the output voltage $V_{OUT}$ of the resonant circuit 21, is coupled electrically to the reference voltage generator 222 for receiving the reference voltage, and calculates and outputs a first control signal based on the reference voltage and the output voltage $V_{OUT}$ for controlling the resonant circuit 21 to maintain resonance. The second controller 225 is for detecting the load voltage $V_L$ across the load 3, stores a preset voltage, and calculates and outputs a second control signal based on the load voltage $V_L$ and the preset voltage for controlling the resonant circuit 21 such that the load voltage $V_L$ is substantially equal to the preset voltage.

In the preferred embodiment, the first and second controllers 221 and 225 operate at the same time, and the first controller 221 controls the capacitances $C_1$ and $C_2$ of the parallel resonant LC circuit and the series resonant LC circuit, while the second controller 225 controls the inductance $L_1$ of the series resonant LC circuit. However, in another configuration, the first controller 221 may control the inductance $L_1$ of the series resonant LC circuit, while the second controller 225 controls the capacitances $C_1$ and $C_2$ of the parallel resonant LC circuit and the series resonant LC circuit.

The first controller 221 includes a comparing unit 223 and a control unit 224. The comparing unit 223 is coupled electrically to the reference voltage generator 222 for receiving the reference voltage and to the resonant circuit 21 for detecting the output voltage $V_{OUT}$, and generates a phase difference signal associated with a phase difference between the reference voltage and the output voltage $V_{OUT}$. The control unit 224 is coupled electrically to the comparing unit 223 for receiving the phase difference signal, and stores a reference phase signal. The reference phase signal represents the phase difference between the open-circuit voltage $V_{OC}$ and the output voltage $V_{OUT}$ when the resonant circuit 21 is resonating, and the phase difference therebetween is 180 degrees in this embodiment. The control unit 224 takes the phase difference signal as a feedback signal and compares the phase difference signal to the reference phase signal so as to calculate and output the first control signal. The first control signal is outputted to one of the first adjustable capacitor $C_{T1}$ (FIG. 3) and the first adjustable inductor $L_{T1}$ (FIG. 4). When the phase difference signal is smaller than 180 degrees, the control unit 224 controls the first adjustable capacitor $C_{T1}$ to increase capacitance thereof (controls the first adjustable inductor $L_{T1}$ to decrease inductance thereof). When the phase difference signal is greater than 180 degrees, the control unit 224 controls the first adjustable capacitor $C_{T1}$ to decrease capacitance thereof (controls the first adjustable inductor $L_{T1}$ to increase inductance thereof). In this way, the resonant circuit 21 may maintain resonance.

It is noted that in another configuration of the preferred embodiment, the reference voltage may be generated directly according to the output voltage $V_{OUT}$ received by the reference voltage generator 222 when the output voltage $V_{OUT}$ reaches the peak value in step 44 as shown in FIG. 7. That is to say, the step 45 may be skipped, and step 46 is performed directly after step 44. In this configuration, when the resonant circuit 21 is resonating, the phase of the output voltage $V_{OUT}$ received at the comparing unit 223 should correspond to the phase of the reference voltage generated in step 46, and thus the reference phase signal stored in the control unit 224 represents a substantially 0 degree phase difference.

The second controller 225 takes the load voltage $V_L$ as a feedback signal for comparison with the preset voltage so as to calculate and output the second control signal. The second control signal is outputted to one of the second adjustable inductor $L_{T2}$ (FIG. 5) and the second adjustable capacitor $C_{T2}$ (FIG. 6). According to the aforementioned equation for representing the value of the output voltage $V_{OUT}$, when the winding inductance $L_S$ remains fixed, the output voltage $V_{OUT}$ is directly proportional to the inductance $L_1$ of the series resonant LC circuit (while the resonant circuit remains resonant). Therefore, when the load voltage $V_L$ is lower than the preset voltage, the second controller 225 controls the inductance $L_1$ to increase. When the load voltage $V_L$ is higher than the preset voltage, the second controller 225 controls the inductance $L_1$ to decrease. In this way, the load voltage $V_L$ may correspond to the preset voltage.

The first and second controllers 221 and 225 operate simultaneously, such that the resonant circuit 21 may keep the load voltage $V_L$ of the load 3 at the preset voltage, and may maintain resonance. The first and second controllers 221 and 225 may adopt the common proportional-integral control.

Figure 9:
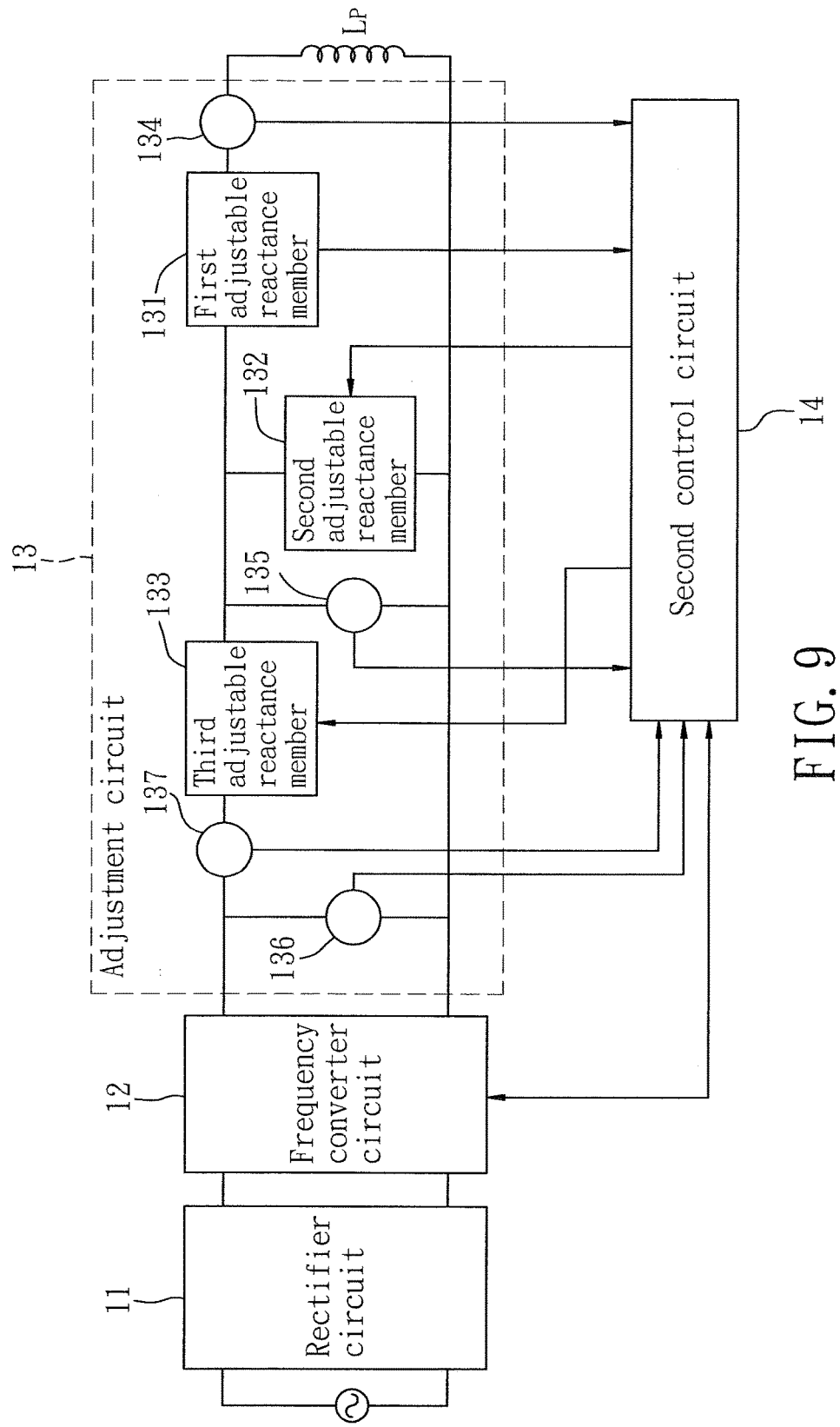
FIG. 9 is a fragmentary circuit diagram of the preferred embodiment illustrating architecture of a power supply device.

Referring to FIG. 9, the power supply system 1 is used to convert an AC signal (i.e., an AC power) having an arbitrary frequency into the AC current flow having the operating frequency for providing power to the power receiving device 2. The power supply device 1 further includes a rectifier circuit 11, a frequency converter circuit 12, an adjustment circuit 13 and a second control circuit 14. In this embodiment, the rectifier circuit 11 is an AC-to-DC converter, and the frequency converter circuit 12 is a DC-to-AC inverter.

The AC-to-DC converter 11 is adapted for receiving the AC signal and converting the AC signal into a DC signal (i.e., a DC power). The DC-to-AC inverter 12 is coupled electrically to the AC-to-DC converter 11 for receiving the DC signal and to the second control circuit 14 so as to be controlled thereby for converting the DC signal into the AC current flow that has the operating frequency. The adjustment circuit 13 is coupled electrically between the DC-to-AC inverter 12 and the primary winding $L_P$, and includes a first adjustable reactance member 131, a second adjustable reactance member 132, a third adjustable reactance member 133, a first sensor 134, a second sensor 135, a third sensor 136 and a fourth sensor 137.

The power receiving device 2 has input impedance when observed from the primary winding $L_P$. The input impedance is at least one of inductive, capacitive and resistive, and may vary along with adjustments of coupling between the power supply device 1 and the power receiving device 2, the load 3, and the resonant circuit 21, so as to influence a current flowing through the primary winding $L_P$.

The first adjustable reactance member 131 is connected in series with the primary winding $L_P$ and is coupled electrically to the second control circuit 14 to be controlled thereby to adjust equivalent reactance of the first adjustable reactance member 131 so as to cancel out reactance of the input impedance. Even though the preferred embodiment of the contactless ICPT system only comprises one of the power supply device 1 and one of the power receiving device 2, it should be noted that the power supply device 1 may supply power to a plurality of power receiving devices 2. Each of the power receiving devices 2 reflects a respective input impedance to the power supply device 1. The first adjustable reactance member 131 may be used to cancel out a sum of the input impedances.

The first sensor 134 is provided for sensing the current flowing through the primary winding $L_P$ and for outputting a current sensing signal related to the current thus sensed. The second control circuit 14 stores a preset current signal, is coupled electrically to the first sensor 134 for receiving the current sensing signal, and outputs a third control signal based on the current sensing signal and the preset current signal for controlling the first adjustable reactance member 131, such that the current flowing though the primary winding $L_P$ (i.e., the current sensing signal) is caused to be substantially equal to the preset current signal.

The second adjustable reactance member 132 is connected in parallel with the primary winding $L_P$ and the first adjustable reactance member 131 that are connected in series, and is coupled electrically to the second control circuit 14 so as to be controlled thereby for adjusting equivalent reactance of the second adjustable reactance member 132, such that a resonant frequency of the third adjustable reactance member 133, the second adjustable reactance member 132, the first adjustable reactance member 131, the primary winding $L_P$ and the input impedance of the power receiving device is caused to be substantially equal to the operating frequency. In this way, the power supply efficiency of the power supply device 1 may be improved. During the process of converting the DC signal into the AC current flow by the DC-to-AC inverter 12, the operating frequency of the AC current flow may be also adjusted by the second control circuit 14 to be variable according to different needs at the load 3. For this reason, the second adjustable reactance member 132 is adjusted in coordination to the operating frequency of the DC-to-AC inverter 12. The second control circuit 14 may also perform the determination of the operating frequency in the aforementioned step 47, and may transmit a result of the determination via a suitable communication interface to the first control circuit 22.

The second sensor 135 is provided for sensing a voltage across the second adjustable reactance member 132 and for outputting a voltage sensing signal related to the voltage thus sensed. The second control circuit further stores a resonant voltage signal that represents a voltage of the second adjustable reactance member 132 when the first adjustable reactance member 131, the second adjustable reactance member 132, the third adjustable reactance member 133, the primary winding $L_P$ and the input impedance resonate at the operating frequency. The second control circuit 14 is further coupled electrically to the second sensor 135 for receiving the voltage sensing signal, and controls the second adjustable reactance member 132 based on the voltage sensing signal and the resonant voltage signal, such that the voltage sensing signal is caused to be substantially equal to the resonant voltage signal. The resonant voltage signal may be generated by an oscillator.

For further promoting the power supply efficiency, the third adjustable reactance member 133 is connected between one end of the second adjustable reactance member 132 and the DC-to-AC inverter 12, and is coupled electrically to the second control circuit 14 to be controlled thereby for adjusting equivalent reactance of the third adjustable reactance member 133, so as to keep the power factor associated with the output of the DC-to-AC inverter 12 at about one.

The third sensor 136 is coupled electrically between output terminals of the DC-to-AC inverter 12, and is provided for sensing a voltage outputted from the DC-to-AC inverter 12. The fourth sensor 137 is coupled electrically to one of the output terminals of the DC-to-AC inverter 12, and is provided for sensing a current outputted from the DC-to-AC inverter 12. When the voltage and the current outputted from the DC-to-AC inverter 12 are kept in phase, the power factor is about one. The second control circuit 14 is further coupled electrically to the third and fourth sensors 136 and 137 for respectively obtaining the voltage and the current of the DC-to-AC inverter 12, and controls the third adjustable reactance member 133 based on the voltage and the current of the DC-to-AC inverter 12, such that the voltage and the current thereof are in phase.

To sum up, the preferred embodiment described herein has the following advantages:

1. The resonant circuit 21 is designed to enable the power receiving device 2 to form an ideal voltage source and to have an adjustable voltage gain.

2. Each of the first control circuit 22 and the second control circuit 14 is capable of dynamically adjusting the capacitance and the inductance of a respective one of the resonant circuit 21 and the adjustment circuit 13, so as to compensate for parameter variations of the contactless ICPT system resulting from environmental change, manufacturing tolerance and aging.

3. The adjustment circuit 13 is designed to stabilize the current flowing though the primary winding $L_P$, to decrease influence resulting from changes at the load 3 and the power receiving device 2 upon the power supply device 1, and to adjust the power factor to be about one. Moreover, the system resonance may be maintained and the operating frequency may be adjusted according to different needs at the load 3.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A contactless inductively coupled power transfer (ICPT) system comprising:
    a power supply device including a primary winding which is for generating an electromagnetic field in response to an alternating current (AC) current flow having a variable operating frequency; and
    a power receiving device including a resonant circuit which is adapted to output an output voltage to a load according to induction of the electromagnetic field, and which includes
        a secondary winding that generates an open-circuit voltage according to said induction of the electromagnetic field, the output voltage being associated with the open-circuit voltage, and
        a reactance element coupled electrically to said secondary winding and capable of forming a parallel resonant LC circuit with the secondary winding, the parallel resonant LC circuit resonating at the operating frequency, said reactance element being configured to form a series resonant LC circuit that resonates at the operating frequency, and that is to be connected in series to the load,
    wherein said power receiving device further includes a first control circuit that is coupled electrically to said resonant circuit, that is to be coupled electrically to the load, and that includes:
        a first controller which is coupled electrically to said resonant circuit to detect the output voltage of said resonant circuit, which receives a reference voltage representing the open-circuit voltage, and which calculates and outputs a first control signal based on the reference voltage and the output voltage for controlling said resonant circuit to maintain resonance, and
        a second controller which is to be coupled electrically to the load to detect a load voltage across the load, which stores a preset voltage, which calculates a second control signal based on the load voltage and the preset voltage, and which is coupled electrically to said resonant circuit to output the second control signal thereto for controlling said resonant circuit such that the load voltage is substantially equal to the preset voltage.

2. The contactless ICPT system as claimed in claim 1, wherein said first controller controls capacitances of the parallel resonant LC circuit and the series resonant LC circuit, and said second controller controls inductance of the series resonant LC circuit.

3. The contactless ICPT system as claimed in claim 1, wherein said first controller controls inductance of the series resonant LC circuit, and said second controller controls capacitances of the parallel resonant LC circuit and the series resonant LC circuit.

4. The contactless ICPT system as claimed in claim 1, wherein said first control circuit further includes a reference voltage generator, capacitance and inductance of the series resonant LC circuit being set to enable an initial state of the output voltage to turn on said first control circuit such that said reference voltage generator is activated, said reference voltage generator being configured to:
    adjust one of the capacitance and the inductance of the series resonant LC circuit so as to vary the output voltage of said resonant circuit;
    receive the output voltage when the output voltage reaches a peak value, the output voltage being at the peak value when a resonant frequency of said resonant circuit corresponds to the operating frequency; and
    alter a phase of the output voltage by an angle so as to generate the reference voltage, the angle being a phase difference between the open-circuit voltage and the output voltage when the resonant circuit is resonating.

5. The contactless ICPT system as claimed in claim 4, wherein said first controller includes:
    a comparing unit which is coupled electrically to said reference voltage generator for receiving the reference voltage and to said resonant circuit for detecting the output voltage, and generates a phase difference signal associated with a phase difference between the reference voltage and the output voltage; and
    a control unit which is coupled electrically to said comparing unit for receiving the phase difference signal, which stores a reference phase signal representing the phase difference between the open-circuit voltage and the output voltage when said resonant circuit is resonating, and which compares the phase difference signal to the reference phase signal so as to calculate and output the first control signal.

6. The contactless ICPT system as claimed in claim 1, wherein said reactance element of said resonant circuit includes:
    a fixed capacitor coupled electrically to two ends of said secondary winding and providing capacitance of the parallel resonant LC circuit;
    a first adjustable capacitor coupled electrically to two ends of said fixed capacitor, and coupled electrically to said first control circuit to be controlled thereby for adjusting equivalent capacitance of said first adjustable capacitor that serves as capacitance of the series resonant LC circuit; and
    an adjustable inductance member which has a first end coupled electrically to one of said two ends of said fixed capacitor and a second end to be coupled electrically to one end of the load, and which is coupled electrically to said first control circuit to be controlled thereby for adjusting equivalent inductance of said adjustable inductance member that serves as inductance of the series resonant LC circuit.

7. The contactless ICPT system as claimed in claim 6, wherein said adjustable inductance member includes:
    a fixed inductor; and
    an adjustable inductor connected in parallel with said fixed inductor, and coupled electrically to said first control circuit to be controlled thereby for adjusting equivalent inductance of said adjustable inductor.

8. The contactless ICPT system as claimed in claim 6, wherein said adjustable inductance member includes:
a fixed inductor; and
a second adjustable capacitor connected in parallel with said fixed inductor, and coupled electrically to said first control circuit to be controlled thereby for adjusting equivalent capacitance of said second adjustable capacitor.

9. The contactless ICPT system as claimed in claim 1, wherein said reactance element of said resonant circuit includes:
a fixed capacitor coupled electrically to two ends of said secondary winding and providing capacitance of the parallel resonant LC circuit, and component capacitance;
a first adjustable inductor coupled electrically to two ends of said fixed capacitor, and coupled electrically to said first control circuit to be controlled thereby for adjusting equivalent inductance of said first adjustable inductor, the component capacitance in combination with the equivalent inductance of said first adjustable inductor serving as capacitance of the series resonant LC circuit; and
an adjustable inductance member which has a first end coupled electrically to one of said two ends of said fixed capacitor and a second end to be coupled electrically to one end of the load, and which is coupled electrically to said first control circuit to be controlled thereby for adjusting equivalent inductance of said adjustable inductance member that serves as inductance of the series resonant LC circuit.

10. The contactless ICPT system as claimed in claim 9, wherein said adjustable inductance member includes:
a fixed inductor; and
a second adjustable inductor connected in parallel with said fixed inductor, and coupled electrically to said first control circuit to be controlled thereby for adjusting equivalent inductance of said second adjustable inductor.

11. The contactless ICPT system as claimed in claim 9, wherein said adjustable inductance member includes:
a fixed inductor; and
an adjustable capacitor connected in parallel with said fixed inductor, and coupled electrically to said first control circuit to be controlled thereby for adjusting equivalent capacitance of said adjustable capacitor.

12. The contactless ICPT system as claimed in claim 1, wherein said reactance element of said resonant circuit includes:
an adjustable capacitor coupled electrically to two ends of said secondary winding, and coupled electrically to said first control circuit to be controlled thereby for adjusting equivalent capacitance of said adjustable capacitor that serves as a capacitance of the parallel resonant LC circuit and a capacitance of the series resonant LC circuit; and
an adjustable inductance member which has a first end coupled electrically to one end of said adjustable capacitor, and a second end to be coupled electrically to one end of the load, and which is coupled electrically to said first control circuit to be controlled thereby for adjusting equivalent inductance of said adjustable inductance member that serves as inductance of the series resonant LC circuit.

13. The contactless ICPT system as claimed in claim 12, wherein said adjustable inductance member includes:
a fixed inductor; and
an adjustable inductor connected in parallel with said fixed inductor, and coupled electrically to said first control circuit to be controlled thereby for adjusting equivalent inductance of said adjustable inductor.

14. The contactless ICPT system as claimed in claim 12, wherein said adjustable inductance member includes:
a fixed inductor; and
a second adjustable capacitor connected in parallel with said fixed inductor, and coupled electrically to said first control circuit to be controlled thereby for adjusting equivalent capacitance of said second adjustable capacitor.

15. A contactless inductively coupled power transfer (ICPT) system comprising:
a power supply device including a primary winding which is for generating an electromagnetic field in response to an alternating current (AC) current flow having a variable operating frequency; and
a power receiving device including a resonant circuit which is adapted to output an output voltage to a load according to induction of the electromagnetic field, and which includes
a secondary winding that generates an open-circuit voltage according to said induction of the electromagnetic field, the output voltage being associated with the open-circuit voltage, and
a reactance element coupled electrically to said secondary winding and capable of forming a parallel resonant LC circuit with the secondary winding, the parallel resonant LC circuit resonating at the operating frequency, said reactance element being configured to form a series resonant LC circuit that resonates at the operating frequency, and that is to be connected in series to the load,
wherein said power receiving device includes:
a first control circuit that is coupled electrically to said resonant circuit, that is to be coupled electrically to the load, and that includes:
a first controller which detects the output voltage of said resonant circuit, which receives a reference voltage, and which calculates and outputs a first control signal based on the reference voltage and the output voltage for controlling said resonant circuit to maintain resonance, and
a second controller which is for detecting a load voltage across the load, which stores a preset voltage, and which calculates and outputs a second control signal based on the load voltage and the preset voltage for controlling said resonant circuit such that the load voltage is substantially equal to the preset voltage;
wherein said first control circuit further includes a reference voltage generator, capacitance and inductance of the series resonant LC circuit being set to enable an initial state of the output voltage to turn on said first control circuit such that said reference voltage generator is activated, said reference voltage generator being configured to:
adjust one of the capacitance and the inductance of the series resonant LC circuit so as to vary the output voltage of said resonant circuit;
receive the output voltage when the output voltage reaches a peak value, the output voltage being at the peak value when a resonant frequency of said resonant circuit corresponds to the operating frequency; and generate the reference voltage based on the output voltage thus received when the output voltage reaches the peak value.

\* \* \* \* \*